US011164458B2

United States Patent
Garamoun et al.

(10) Patent No.: US 11,164,458 B2
(45) Date of Patent: Nov. 2, 2021

(54) DEVICE FOR MONITORING AN OCCUPANCY STATUS OF A PARKING SPACE OF A PARKING AREA, AND A SYSTEM AND A PARKING AREA THAT INCLUDE SUCH A DEVICE

(71) Applicant: Robert Bosch GmbH, Stuttgart (DE)

(72) Inventors: Ahmed Garamoun, Stuttgart (DE); Ronny Schmid, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/604,594

(22) PCT Filed: Apr. 26, 2018

(86) PCT No.: PCT/EP2018/060703
§ 371 (c)(1),
(2) Date: Oct. 11, 2019

(87) PCT Pub. No.: WO2018/206298
PCT Pub. Date: Nov. 15, 2018

(65) Prior Publication Data
US 2020/0098264 A1  Mar. 26, 2020

(30) Foreign Application Priority Data
May 10, 2017  (DE) .......................... 102017207916.9

(51) Int. Cl.
*G08G 1/14* (2006.01)
*H04W 4/80* (2018.01)
(Continued)

(52) U.S. Cl.
CPC .......... *G08G 1/144* (2013.01); *G06K 19/0727* (2013.01); *G08G 1/142* (2013.01);
(Continued)

(58) Field of Classification Search
CPC .......... G08G 1/144; G08G 1/142; G08G 1/04; G08G 1/042; G08G 1/146; G08G 1/017;
(Continued)

(56) References Cited

U.S. PATENT DOCUMENTS 9,728,085 B2 * 8/2017 Schwarz ................ G08G 1/017
9,818,300 B1 * 11/2017 Nnaji ..................... G08G 1/142
(Continued)

FOREIGN PATENT DOCUMENTS

DE        29908872 U1    10/1999
DE     102014215705 A1    2/2016
(Continued)

OTHER PUBLICATIONS

International Search Report dated Jul. 5, 2018 of the corresponding International Application PCT/EP2018/060703 filed Apr. 26, 2018.
(Continued)

*Primary Examiner* — Daryl C Pope
(74) *Attorney, Agent, or Firm* — Norton Rose Fulbright US LLP; Gerard Messina

(57) ABSTRACT

A device for monitoring an occupancy status of a parking space of a parking area includes a sensor unit for detecting the occupancy status, a near-field communication unit, and a processing unit configured to (a) establish a first wireless data link to a first communication unit of a first external device using the near-field communication unit, (b) receive an activation and/or deactivation command from the external device via the first data link, and (c) activate and/or deactivate the sensor unit upon receipt of the activation and/or deactivation command. The parking area can include the device. Additionally, a system can includes the device and a first external device that includes the first communication unit.

11 Claims, 2 Drawing Sheets

(51) Int. Cl.
*G06K 19/07* (2006.01)
*H04B 5/00* (2006.01)
*H04W 84/18* (2009.01)

(52) U.S. Cl.
CPC ......... *H04B 5/0031* (2013.01); *H04B 5/0062* (2013.01); *H04W 4/80* (2018.02); *H04W 84/18* (2013.01)

(58) Field of Classification Search
CPC ........ G08G 1/147; H04W 4/80; H04W 84/18; G06K 19/0727; H04B 5/0031; H04B 5/0062; G08C 2201/93; G08C 17/04; G08C 17/02
USPC ...................................... 340/932.2, 901–905
See application file for complete search history.

(56) References Cited

U.S. PATENT DOCUMENTS

2002/0109610 A1* 8/2002 Katz ..................... G07B 15/02
340/932.2
2012/0143657 A1* 6/2012 Silberberg ......... G06Q 30/0207
705/14.1
2015/0373482 A1* 12/2015 Barnard ................... H04L 1/08
370/338
2016/0300401 A1 10/2016 Povolny et al.

FOREIGN PATENT DOCUMENTS

| | | |
|---|---|---|
| DE | 102015210116 B3 | 11/2016 |
| GN | 103280121 A | 9/2013 |
| GN | 105118303 A | 12/2015 |
| KR | 20120111292 A | 10/2012 |

OTHER PUBLICATIONS

Finkenzeller, Klaus: RFID-Handbuch—Grundlagen und praktische Anwendungen von Transpondern; kontaktlosen Chipkarten und NFC. 6. Auflage. Munchen: Hanser, 2012. Titelblatt + Impressum + Seiten 282-285—ISBN 978-3446-42992-5.

* cited by examiner

DEVICE FOR MONITORING AN OCCUPANCY STATUS OF A PARKING SPACE OF A PARKING AREA, AND A SYSTEM AND A PARKING AREA THAT INCLUDE SUCH A DEVICE

CROSS-REFERENCE TO RELATED APPLICATIONS

The present application is the national stage of International Pat. App. No. PCT/EP2018/060703 filed Apr. 26, 2018, and claims priority under 35 U.S.C. § 119 to DE 10 2017 207 916.9, filed in the Federal Republic of Germany on May 10, 2017, the content of each of which are incorporated herein by reference in their entireties.

FIELD OF THE INVENTION

The present invention relates to a device for monitoring an occupancy status of a parking space of a parking area, including a processing unit, a sensor unit for detecting the occupancy status, and a near-field communication unit, the processing unit being configured to establish a first wireless data link to a first communication unit of a first external device using the near-field communication unit.

BACKGROUND

Published Unexamined Patent Application KR 102012111292 A, describes an example space occupancy monitoring device, where a near-field communication unit is used to receive authorization data of a vehicle that is parking at the parking space, and based on this authorization data, it is checked whether the vehicle is authorized to park at this parking space. If there is no authorization, an alarm signal, for example, can then be output.

Such a device generally includes a mechanical on and off switch. This on and off switch can be implemented using a reed switch, for example, which is activatable by use of a magnet.

To start up such a device, thus far a device-specific barcode has generally been read in using a barcode reader and associated with a corresponding position. "Start-up" is understood to mean, for example, that the position of the device, for example the number of the parking space at which the device is situated, is stored in a site plan, and this position is linked to the device ID. Moreover, the present invention relates to a parking area and a system, each including a device according to the present invention.

SUMMARY

The present invention relates to a device for monitoring an occupancy status of a parking space of a parking area, including a processing unit, a sensor unit for detecting the occupancy status, and a near-field communication unit. The processing unit is configured to establish a first wireless data link to a first communication unit of a first external device using the near-field communication unit.

In addition, the processing unit is configured to receive an activation and/or deactivation command from the external device via the first data link. Furthermore, the processing unit can be configured to activate and/or deactivate the sensor unit upon receipt of such an activation and/or deactivation command.

Activation or deactivation of the sensor unit is understood to mean that the sensor unit is awakened from a standby state or is placed in a standby state, or also that the supply of electrical power to the sensor unit is started or interrupted. In the activated state, measured values can be detected using the sensor unit, as a function of which the occupancy status of a parking space is ascertainable. The occupancy status indicates whether the parking space is occupied by an object, for example a motor vehicle or a two-wheeler, or is vacant.

In addition, "upon receipt" is understood to mean that as soon as the activation and/or deactivation command is received, the sensor unit is activated or deactivated, immediately or with a certain delay, and the appropriate action takes place following the receipt.

The sensor unit for detecting the occupancy status can include, for example, an inductive sensor, a capacitive sensor, an ultrasonic sensor, a radar sensor, a camera, and/or a light sensor.

The first external device can be a mobile telephone, a tablet, or some other mobile device, for example, the first communication unit of the first external device being equipped with the identical communication standard as the near-field communication unit of the device according to the present invention to allow the first data link to be established.

The processing unit can be a microcontroller, for example.

It is advantageous that the device does not have to include a mechanical on/off switch to allow the sensor unit to be appropriately activated or deactivated. The material and manufacturing costs for the device can thus be reduced. In addition, a device without such a mechanical switch can be better protected from manipulation attempts by unauthorized persons. In addition, due to the lack of a mechanical load, the reliability of the device can be increased, and failures of the device can be avoided. Furthermore, an inadvertent activation or deactivation, which is possible with a reed switch, for example, which can be accidentally switched by an external magnetic field in the surroundings of the device, can be avoided.

An example embodiment of the present invention provides that the near-field communication unit includes an RFID unit, in particular an NFC unit.

It is advantageous that this represents an energy-saving option for data transmission. In addition, the range of such a near-field communication unit is limited to several tens of centimeters, so that unauthorized persons cannot establish a data link to the device from an arbitrary location and control the device.

An example embodiment of the present invention provides that the device includes a memory unit for accommodating a stored identifier, the processing unit being configured to receive via the first data link a specific identifier from the first external device, and compare it to the stored identifier.

In particular, in this way an asymmetrical encryption can be implemented, which can be used to check whether the first external device is authorized to exchange data with the device via the first data link. For example, a private key of the device can be utilized for this purpose. Once again, a targeted manipulation by unauthorized persons can be prevented in this way.

The memory unit can be designed as an independent unit, for example, or can be integrated into the processing unit.

An example embodiment of the present invention provides that the processing unit, upon receipt of an activation or deactivation command via the first data link, is configured to activate or deactivate the sensor unit when the stored identifier and the received identifier match.

It is advantageous that an activation or deactivation of the sensor unit can be carried out only by an authorized user. Once again, attempts to manipulate the device can be prevented in this way.

According to an example embodiment of the present invention, it is provided that the processing unit is configured to receive from the first external device a changed sensor setting and/or a software update via the first data link and store it/them in the memory unit when the stored identifier and the received identifier match. It is advantageous that the first data link can also be utilized by an authorized user for additional functions.

According to an example embodiment of the present invention, it is provided that the processing unit is configured to transmit a device ID, stored in the memory unit, to the first external device via the first data link when the stored identifier and the received identifier match.

It is advantageous that the external device can utilize the device ID, for example, to carry out a start-up of the device. An additional barcode reader, for example, is not necessary for this purpose.

The position can then be determined, for example, in that the external device includes a GPS receiver, or a user inputs the parking space number.

If during operation the device then transmits, for example, an occupancy status to a higher-order unit, a server, for example, its device ID can deduce where the device is located, and thus, with which parking space the detected occupancy status can be associated.

An example embodiment of the present invention provides that the device includes a far-field communication unit, in particular a long range (LoRa) unit, the processing unit being configured to establish a second wireless data link to a second communication unit of a second external device using the far-field communication unit, and to receive the deactivation command via the second data link and to deactivate the sensor unit upon receipt.

It is advantageous that the deactivation can also be carried out over a large range. Thus, LoRa allows a range of several kilometers, for example, by using a low-power wide-area network (LPWAN) specification. In this way an emergency shut-off of the corresponding sensor unit, among other things, can be carried out when, for example, theft of the device is determined, or the device is malfunctioning. For this purpose, the second external device does not have to be in the immediate proximity of the device according to the present invention.

The second communication unit could also include a WLAN unit or mobile radio unit, for example.

The second external device can be a parking area management unit, for example, that is situated in the vicinity of the parking area, for example, or that could also be designed as a server or as a cloud situated remote from the parking area.

Moreover, the present invention relates to a parking area that includes a device according to the present invention and also a system that includes a device according to the present invention and a first external device that includes a first communication unit. The parking area can be, for example, a parking facility, a parking deck, or any other parking area such as a resident parking area.

DETAILED DESCRIPTION

Figure 1:
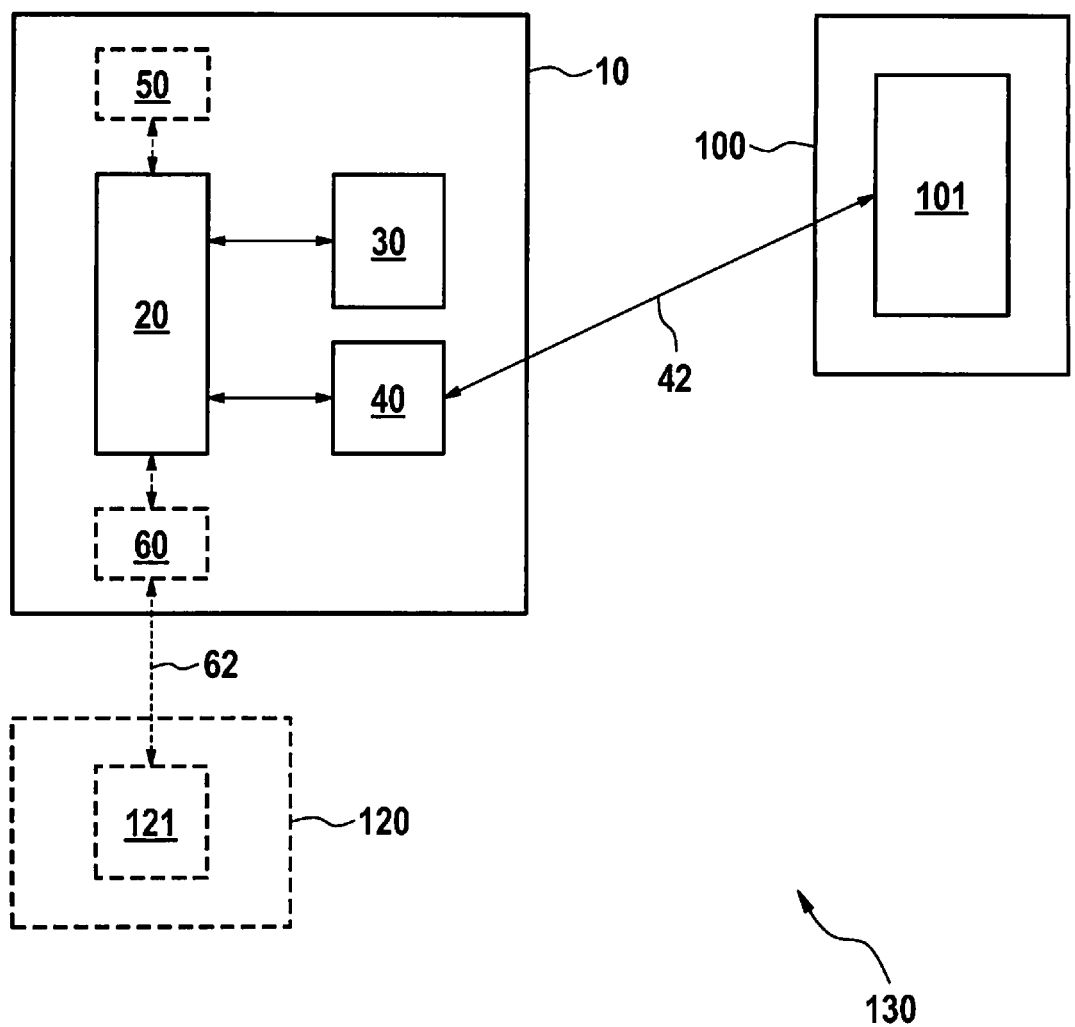
FIG. 1 shows a device for monitoring an occupancy status of a parking space of a parking area according to an example embodiment of the present invention.

FIG. 1 shows an example device 10 for monitoring an occupancy status of a parking space of a parking area. Device 10 includes a processing unit 20, a sensor unit 30, and a near-field communication unit 40. Sensor unit 30 and near-field communication unit 40 are each connected to processing unit 20. Processing unit 20 is configured to establish a first wireless data link 42 to a first communication unit 101 of a first external device 100 using near-field communication unit 40. Processing unit 20 is also configured to receive an activation and/or deactivation command from external device 100 via first data link 42, and to activate or deactivate sensor unit 30 upon receipt of an appropriate command.

According to the example embodiment in FIG. 1, device 10 optionally includes a memory unit 50. Memory unit 50 is in turn connected to processing unit 20. A stored identifier, for example, is stored in memory unit 50. Similarly, processing unit 20 can be configured to receive a specific identifier via first data link 42 and to compare this specific identifier to the stored identifier. If these identifiers match, processing unit 20 can appropriately respond. Thus, for example, processing unit 20 can be configured to activate or deactivate sensor unit 30 only when a match of the identifiers is confirmed, and thus an authorization of first external device 100 has taken place.

In addition, according to the example embodiment in FIG. 1, device 10 optionally also includes a far-field communication unit 60. Far-field communication unit 60 is likewise connected to processing unit 20. Processing unit 20 is configured to establish a second wireless data link 62 to a second communication unit 121 of a second external device 120 using far-field communication unit 60. In addition, processing unit 20 is configured to receive the deactivation command via second data link 62 and to deactivate sensor unit 30 upon receipt.

The connections between processing unit 20 and the other units of device 10 have a unidirectional or bidirectional design, depending on the requirements.

Figure 2:
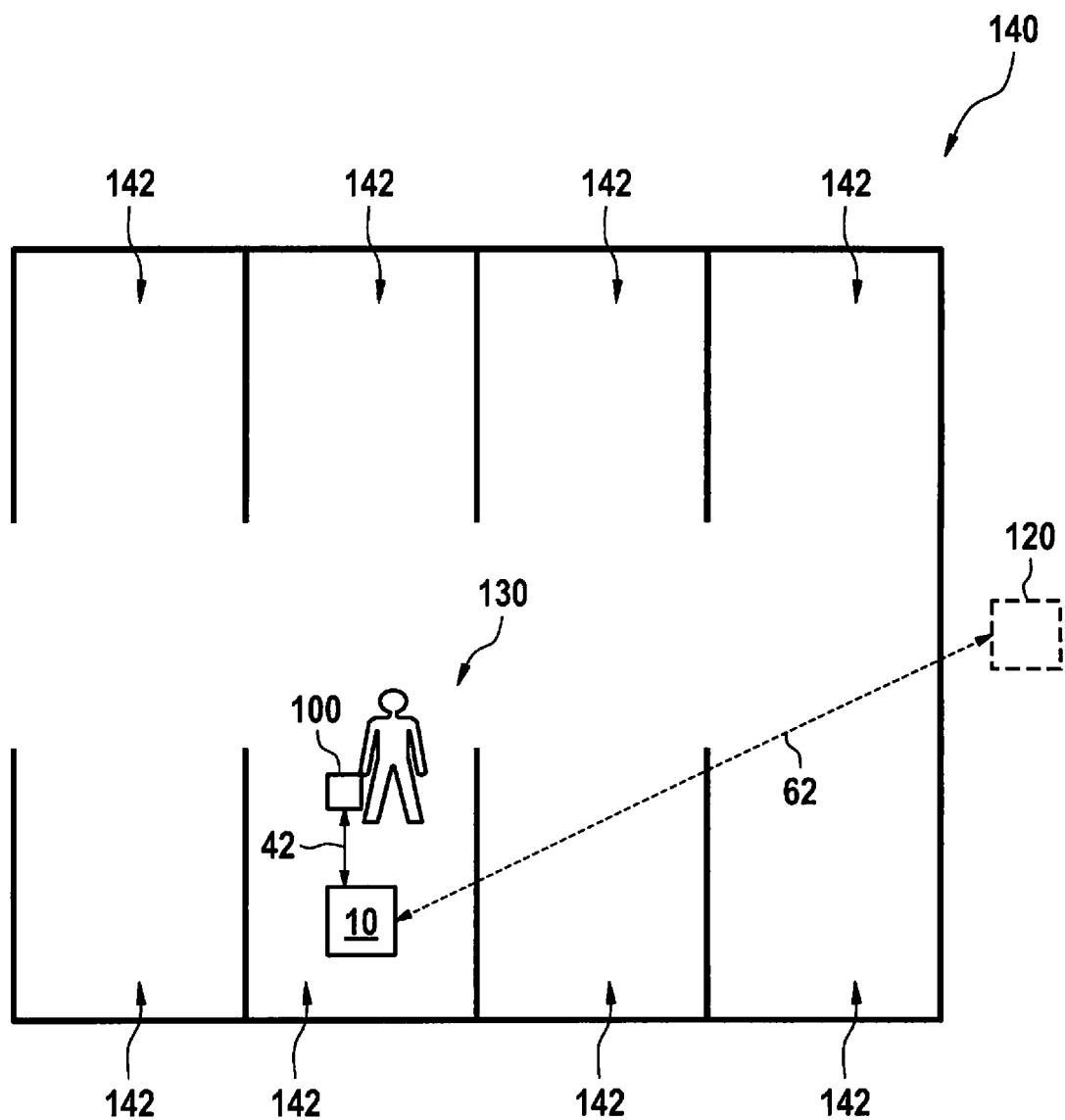
FIG. 2 shows a parking area that includes a device according to an example embodiment of the present invention.

FIG. 2 shows an example embodiment of a parking area that includes a device according to the present invention.

A parking area 140 for motor vehicles is illustrated. Parking area 140 includes multiple parking spaces 142. For example, a device 10 according to the present invention is situated on one of these parking spaces 142 in order to monitor the occupancy status of this parking space 142. Device 10, corresponding to FIG. 1, is connected to a first external device 100 via a first wireless data link 42. Device 10 and first external device 100 form a system 130 that is used for start-up of device 10.

In addition, device 10 is optionally connected to a second external device 120 via a second wireless connection 62.

What is claimed is:
1. A device for monitoring an occupancy status of a parking space of a parking area, the device comprising:
   a processor;
   an occupancy sensor;
   a near-field communication unit; and
   a far-field communication unit, wherein the processor is configured to:
establish a first wireless data link to a communication unit of a first external device via the near-field communication unit;
receive an activation and/or deactivation command from the external device via the first data link;
establish via the far-field communication unit a second wireless data link to a communication unit of a second external device;
receive the deactivation command via the second data link; and
deactivate the sensor in response to the receipt of the deactivation command via the second data link,
activate and/or deactivate the occupancy sensor responsive to the command, wherein the occupancy sensor is activated by being awakened from a standby state or that a supply of electrical power to the sensor unit is started, and the occupancy sensor is deactivated by being placed in the standby state or that the supply of electrical power to the sensor unit is uninterrupted.

2. The device of claim 1, wherein the near-field communication unit includes a Radio Frequency Identification (RFID) unit.

3. The device of claim 1, further comprising a memory, wherein the processor is configured to compare an identifier received via the first data link from the first external device to a stored identifier that is stored in the memory.

4. The device of claim 3, wherein the processor is configured to perform the activation and/or deactivation conditional upon a match being determined in the comparison.

5. The device of claim 3, wherein the processing unit is configured to receive from the first external device via the first data link a changed sensor setting and/or a software update and, conditional upon a match being determined in the comparison, store the received changed sensor setting and/or software update in the memory.

6. The device of claim 3, wherein the processor is configured to, conditional upon a match being determined in the comparison, transmit a device ID stored in the memory to the first external device via the first data link.

7. The device of claim 1, wherein the far-field communication unit is a long range (LoRa) unit.

8. A system for monitoring an occupancy status of a parking space of a parking area, the system comprising:
a first device that includes a first communication unit; and
a second device that is external to the first device and that includes;
a processor;
an occupancy sensor;
a near-field communication unit; and
a far-field communication unit,
wherein the processor is configured to:
establish via the near-field communication unit a first wireless data link to the first communication unit of the first device;
receive an activation and/or deactivation command from the first device via the first data link; and
establish via the far-field communication unit a second wireless data link to a communication unit of a second external device;
receive the deactivation command via the second data link; and
deactivate the sensor in response to the receipt of the deactivation command via the second data link,
activate and/or deactivate the occupancy sensor responsive to the command, wherein the occupancy sensor is activated by being awakened from a standby state or that a supply of electrical power to the sensor unit is started, and the occupancy sensor is deactivated by being placed in the standby state or that the supply of electrical power to the sensor unit is uninterrupted.

9. A parking area for motor vehicles, the parking area comprising:
at least one parking space; and
a device for monitoring an occupancy status of the at least one parking space, the device comprising:
a processor;
an occupancy sensor;
a near-field communication unit; and
a far-field communication unit,
wherein the processor is configured to:
establish a first wireless data link to a communication unit of a first external device via the near-field communication unit;
receive an activation and/or deactivation command from the external device via the first data link;
establish via the far-field communication unit a second wireless data link to a communication unit of a second external device;
receive the deactivation command via the second data link; and
deactivate the sensor in response to the receipt of the deactivation command via the second data link,
activate and/or deactivate the occupancy sensor responsive to the command, wherein the occupancy sensor is activated by being awakened from a standby state or that a supply of electrical power to the sensor unit is started, and the occupancy sensor is deactivated by being placed in the standby state or that the supply of electrical power to the sensor unit is uninterrupted.

10. A non-transitory computer-readable medium on which are stored instructions that are executable by a processor and that, when executed by the processor, causes the processor to perform a method, the method comprising:
transmit, to a device that includes a processor, an occupancy sensor, and a near-field communication unit, an activation and/or deactivation command in response to which the processor of the device is configured to activate and/or deactivate the occupancy sensor, the transmission being via a wireless data link established via the near-field communication unit.

11. The non-transitory computer-readable medium of claim 10, wherein the instructions use an asymmetrical encryption.

* * * * *